(12) United States Patent
Kerr

(10) Patent No.: US 9,176,536 B2
(45) Date of Patent: Nov. 3, 2015

(54) WIRELESS DISPLAY FOR ELECTRONIC DEVICES

(75) Inventor: Duncan Kerr, San Francisco, CA (US)

(73) Assignee: Apple, Inc., Cupertino, CA (US)

(*) Notice: Subject to any disclaimer, the term of this patent is extended or adjusted under 35 U.S.C. 154(b) by 189 days.

(21) Appl. No.: 13/250,673

(22) Filed: Sep. 30, 2011

(65) Prior Publication Data
US 2013/0084796 A1 Apr. 4, 2013

(51) Int. Cl.
H04W 4/00 (2009.01)
H04M 1/00 (2006.01)
G06F 1/16 (2006.01)
H05K 7/10 (2006.01)

(52) U.S. Cl.
CPC ............ *G06F 1/1654* (2013.01); *G06F 1/1616* (2013.01); *G06F 1/1683* (2013.01)

(58) Field of Classification Search
CPC ..... H04W 16/14; H04W 52/24; H04W 28/04; G06K 7/0008; H04N 21/4143
USPC ............. 455/39, 41.1, 41.2, 41.3, 127.1, 128, 455/145, 269, 343.1, 346, 347, 348, 572, 455/90.3
See application file for complete search history.

(56) References Cited

U.S. PATENT DOCUMENTS

| | | |
|---|---|---|
| 5,869,919 A | 2/1999 | Sato et al. |
| 6,115,618 A | 9/2000 | Lebby et al. |
| 6,512,670 B1 * | 1/2003 | Boehme et al. .......... 361/679.29 |
| 6,630,970 B2 | 10/2003 | Trapani et al. |
| 6,720,961 B2 | 4/2004 | Tracy |
| 6,906,762 B1 | 6/2005 | Witehira et al. |
| 6,937,249 B2 | 8/2005 | Herbert et al. |
| 7,110,104 B2 | 9/2006 | Choi et al. |
| 7,182,463 B2 | 2/2007 | Conner et al. |
| 7,205,959 B2 | 4/2007 | Henriksson |
| 7,221,332 B2 | 5/2007 | Miller et al. |
| 7,232,058 B2 | 6/2007 | Lee |
| 7,301,691 B2 | 11/2007 | O'Donnell |
| 7,413,331 B2 | 8/2008 | Hatanaka et al. |
| 7,505,049 B2 | 3/2009 | Engel |
| 7,587,120 B2 | 9/2009 | Koo et al. |

(Continued)

FOREIGN PATENT DOCUMENTS

| | | |
|---|---|---|
| CN | 1662625 | 8/2005 |
| CN | 1979231 | 6/2007 |

(Continued)

OTHER PUBLICATIONS

International Search Report and Written Opinion, PCT Application No. PCT/US2009/058706, 19 pages, Dec. 10, 2009.

(Continued)

*Primary Examiner* — Edward Urban
*Assistant Examiner* — Ralph H Justus
(74) *Attorney, Agent, or Firm* — Joseph F. Guihan

(57) ABSTRACT

A computer including a base and a display selectively removable from the base. The base includes a processor, a base wireless chip, and a power source. The display includes a screen for displaying a video output, a display wireless chip in communicating with the base wireless chip, and a power wireless chip in communication with the power source. The base wireless chip transmits data from the processor to the display. Also, when the display is at least in one position with respect to the base, the power source transmits power to the power transition member of the display.

21 Claims, 6 Drawing Sheets

(56) References Cited

U.S. PATENT DOCUMENTS

| | | |
|---|---|---|
| 7,619,585 B2 | 11/2009 | Bell et al. |
| 7,619,604 B2 | 11/2009 | Karman et al. |
| 7,626,594 B1 | 12/2009 | Witehira et al. |
| 7,701,427 B2 | 4/2010 | Yamagishi |
| 7,724,208 B1 | 5/2010 | Engel et al. |
| 7,730,413 B1 | 6/2010 | Engel et al. |
| 7,738,053 B2 | 6/2010 | Kubota |
| 7,746,423 B2 | 6/2010 | Im et al. |
| 7,751,860 B2* | 7/2010 | Symons et al. ............ 455/575.3 |
| 7,773,413 B2 | 8/2010 | Shalvi |
| 7,936,426 B2 | 5/2011 | Harding et al. |
| 8,054,391 B2 | 11/2011 | Ishikawa et al. |
| 8,072,402 B2 | 12/2011 | Xu |
| 8,104,816 B2* | 1/2012 | Lupton et al. ................ 296/37.1 |
| 8,105,507 B2 | 1/2012 | Jang et al. |
| 8,106,852 B2 | 1/2012 | Fujinawa et al. |
| 8,115,700 B2 | 2/2012 | Schlottmann et al. |
| 8,143,598 B2 | 3/2012 | Lewis et al. |
| 8,146,277 B2 | 4/2012 | Engel |
| 8,228,323 B2 | 7/2012 | Bandel et al. |
| 8,243,426 B2 | 8/2012 | Chen et al. |
| 8,493,365 B2 | 7/2013 | Jhu et al. |
| 8,581,444 B2* | 11/2013 | Urano ........................... 307/104 |
| 2002/0000967 A1 | 1/2002 | Huston et al. |
| 2003/0160767 A1 | 8/2003 | Wong et al. |
| 2003/0198008 A1 | 10/2003 | Leapman et al. |
| 2007/0195279 A1 | 8/2007 | Park |
| 2008/0049431 A1 | 2/2008 | Boek et al. |
| 2008/0122865 A1 | 5/2008 | Lee |
| 2008/0174724 A1 | 7/2008 | Nakayama et al. |
| 2008/0231548 A1 | 9/2008 | Koyama |
| 2009/0015541 A1 | 1/2009 | Honbo |
| 2009/0111531 A1* | 4/2009 | Cui et al. ...................... 455/572 |
| 2009/0135090 A1 | 5/2009 | Kim |
| 2009/0174846 A1 | 7/2009 | Ito |
| 2009/0201577 A1 | 8/2009 | LaPlante et al. |
| 2009/0262084 A1* | 10/2009 | Yu ................................. 345/173 |
| 2010/0091039 A1 | 4/2010 | Marcu et al. |
| 2010/0091048 A1 | 4/2010 | Aitken et al. |
| 2010/0238366 A1 | 9/2010 | Chang et al. |
| 2010/0265648 A1 | 10/2010 | Hirabayashi |
| 2011/0007245 A1 | 1/2011 | Yoon et al. |
| 2011/0091051 A1* | 4/2011 | Thomason et al. ........... 381/103 |
| 2011/0128477 A1 | 6/2011 | Izaki et al. |
| 2011/0175902 A1 | 7/2011 | Mahowald |
| 2011/0199726 A1* | 8/2011 | Moser ...................... 361/679.09 |
| 2012/0188245 A1 | 7/2012 | Hyatt |
| 2012/0307364 A1 | 12/2012 | Chen et al. |
| 2013/0194281 A1 | 8/2013 | Chen et al. |
| 2013/0335677 A1 | 12/2013 | You et al. |

FOREIGN PATENT DOCUMENTS

| | | |
|---|---|---|
| CN | 101243337 | 8/2008 |
| CN | 101495891 | 7/2009 |
| EP | 0272655 | 6/1988 |
| EP | 1158484 | 11/2001 |
| EP | 1355221 | 10/2003 |
| EP | 1962265 | 8/2008 |
| EP | 1390938 | 12/2008 |
| EP | 2494603 | 9/2012 |
| JP | 06006733 | 1/1994 |
| JP | 9-318817 | 12/1997 |
| JP | 2005227334 | 8/2005 |
| JP | 2008224331 | 9/2008 |
| JP | 2009266687 | 11/2009 |
| WO | WO0109664 | 2/2001 |
| WO | WO0115128 | 3/2001 |
| WO | WO2005059880 | 6/2005 |
| WO | WO2006112740 | 10/2006 |
| WO | WO 2011/097393 | 8/2011 |
| WO | WO 2012/068543 | 5/2012 |

OTHER PUBLICATIONS

Author Unknown, "Visual Impact/Usability Benefits," PureDepth, http://www.puredepth.com/technologyPlatform_visualImpactAndUsabilityBenefits, 2 pages, at least as early as Jan. 20, 2010.
Bertolucci, Jeff, "Offbeat Tech: The Misfits of CES," http://www.pcworld.com/article/186406/samsung_transparent_14inch_oled_laptop.html, 2 pages, Jan. 8, 2010.
Invitation to Correct Defects dated May 15, 2013, PCT/US2012/055373, 8 pages.
International Search Report and Written Opinion dated Jul. 26, 2013, PCT/US2012/055373, 14 pages.
Lau, "High-speed short-range systems for wireless personal area networks," Wireless Telecommunications Symposium, WTS 2009, IEEE, Piscataway, New Jersey, USA, Apr. 22, 2009, 4 pages.
U.S. Appl. No. 13/630,785, filed Sep. 28, 2012, You.
U.S. Appl. No. 13/690,556, filed Nov. 30, 2012, Chen et al.

* cited by examiner

WIRELESS DISPLAY FOR ELECTRONIC DEVICES

TECHNICAL FIELD

The present invention relates generally to electronic devices and more specifically, to portable electronic devices.

BACKGROUND

Power and data transfer to and from a display screen of a computing device often require cables, printed circuit boards with the requisite connections, or other wired connections. These wired connections may require space within the enclosure of the electronic device, which can increase the size of the electronic device, or require a reduction in the size of other components, such as processors, hard drives, and so on.

Additionally, laptop or portable computing devices may require rigid supports or connection members to secure a display to a computing base (e.g., portion of the laptop including the keyboard). These rigid supports securely attached the display to the base and prevent the display being removed from the base, while allowing the display to be rotated between an open and closed position. Furthermore, the rigid supports may increase as the size of the display increases, and thus may require additional space within the enclosure that may already be used for enclosing the cables or wiring transferring data and power to the display.

SUMMARY

Examples of embodiments described herein may take the form of a computer including a base and a display selectively removable from the base. The base includes a processor, a base wireless chip, and a power source. The display includes a screen for displaying a video output, a display wireless chip in communication with the base wireless chip, and a power wireless chip in communication with the power source. The base wireless chip transmits data from the processor to the display. Also, when the display is at least in one position with respect to the base, the power source transmits power to the power transmitting member of the display.

Other embodiments may take the form of an electronic display configured to connect to a computer base. The electronic display includes a screen for displaying a video output, a wireless chip configured to transmit data corresponding to the video output over a 60 GHz signal to the base, and a power source in communication with the screen.

Still other embodiments may a take the form of a portable computer. The portable computer may include a first portion and a second portion operably coupled to and selectively removable from the first portion. The first portion includes a processor, a first wireless component in communication with the processor, and a power source in communication with the processor. The first portion further includes an enclosure at least partially surrounding the processor and a first power transfer member extending at least partially outside of the enclosure. The second portion includes a screen and a second wireless component in communication with the first wireless component and the screen. The second portion further includes a second power transfer member in electrical communication with first power transfer member. The first power transfer member communicates power to the second power transfer member and the first power transfer member and the second power transfer member cooperate to support to selectively couple the first portion and the second portion.

SPECIFICATION

Overview

Figure 1A:
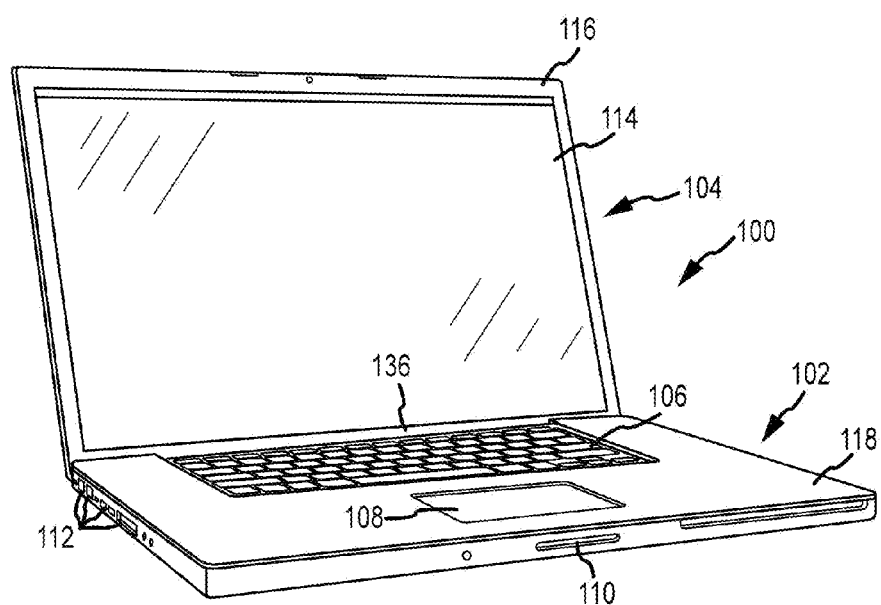
FIG. 1A is a perspective view of a computing device, including a base and a display, in an open position.

Some embodiments described herein may take the form of a computing device including a base and a display selectively removable from the base. When connected or coupled to the base, the display may be rotatable and may pivot from an open position to a closed position. When disconnected or decoupled from the base, the display may be positioned in substantially any manner suitable by the user for viewing the display.

The display may communicate with the base wirelessly and data and/or power may be transmitted to and from the base and the display without the need for cables or wires. The data and power transmission may be wireless when the display is decoupled from the base and wired when the display is coupled to the base. In other embodiments, the power and/or data transfer may be wireless when the display is either coupled or decoupled from the base. In one example, the display and base may each communicate via a 60 GHz wireless chip. In another example, substantially any type of data transmission may be used, e.g., Bluetooth, WiFi, and so on.

In some examples, the display may transfer data to the base. For example, the display may include a sensor, such as an image sensor, an input sensor, or the like and may transfer data related to the sensor(s) to the base. In another example, the display may include a graphical processing unit and may transfer data related to the graphical processing unit to the base, as or after the respective images or videos are displayed by the screen. Likewise, any operational parameter, sensor data, or other data may be transferred from the display to the base, either when the base and display are coupled or uncoupled. Operating parameters may include temperature, display settings, brightness, and the like, as well as any user inputs may through selection or input mechanisms on the display itself. Data that may be used by the base (or a processor in the base) to control, coordinate or monitor operation of the base and/or display may likewise be transferred.

In addition to data, the base or display may transmit power wirelessly to the display or base, respectively. In one example, the base and the display may transmit and receive power, respectively, via induction, capacitive resonance, or other means. For example, the base and the display may include support members or connection portions, such as a hinge system (e.g., hinge and support) which may support the display on the base when connected thereto and may also transfer power from the base to the display. Power transfer between the base and the display may occur while the display is connected to the base or when the display is removed. In another example, power and/or data may be transferred to the display wirelessly when the display is detached from the base, but power and/or data may be transferred via the hinge or a wired component when the display is attached to the base. This allows the computing device to have a removable display, but also may have more efficient power and/or data transfer when the display is attached.

The support members and/or connection portions may also be retractable into their respective enclosures. In these embodiments, the support members and connection portions may retract when the display is decoupled from the base and may extend as the display is repositioned with the base. For example, the support members and/or connection portions may snap fit via a latch or spring biased member into place when the display is docked in the base.

The various embodiments further described herein may allow the size, weight, component count (e.g., number of components for a device), and/or cost of the computing device may be reduced. Conventional computing devices including an attached display, a clutch barrel or other component positioned at an interface between the display and the base typically route data and power transmission cables from the base to the display in order to provide data and/or power to the display. Often, such routing goes through the clutch barrel of a hinge. Since the hinge or joinder structure may have various cables run through it, it may be relatively bulky. If the data and/or power cabling between base and display could be eliminated, then this structure could be removed or shrunk in size. As electronic device become smaller and smaller, these types of space savings may be useful. Furthermore, as the size of the display increases, a size of the hinge or other support structure for the display may need to increase, thus further increasing the size of the components at the interface between the display and the base.

On the contrary, as the base and the display transmit data and/or power wirelessly, the size of the clutch barrel and/or other interface components may be reduced. This may allow the interface components, and specifically, a clutch barrel, to be substantially reduced if not eliminated. This may lower a cost of the device, weight of the device, and/or component count of the device, as fewer components or smaller components may be used.

Furthermore, the size of the hinge system or other support members for both the display and the base may be increased without interfering with the size of the base. Thus, a large display may be supported by an appropriately sized hinge or support member, without increasing the size of the base or requiring a decreased size of components in the base, such as a processor, hard drive, or the like.

DETAILED DESCRIPTION

Figure 1B:
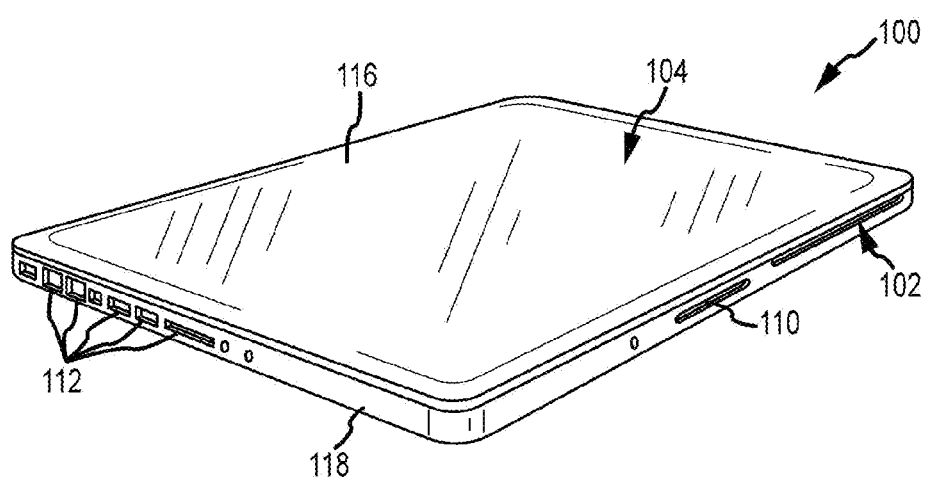
FIG. 1B is a perspective view of a computing device in a closed position.

In one embodiment the computing device may include a display and a base. FIG. 1A is an isometric view of a computing device 100 opened to show a display 104, with the display positioned at an obtuse angle with respect to the base 102. FIG. 1B is an isometric view of the computing device 100 closed, with the display 104 positioned substantially parallel to and adjacent the base 102. The display 104 may be removably and rotatably connected to the base 102, allowing the display 104 to be rotated between an open position (FIG. 1A) and a closed position (FIG. 1B). It should be noted that other positions between the ones illustrated in FIGS. 1A and 1B are possible; e.g., the display 104 may be positioned at an acute angle with respect to the base 102.

Figure 2:
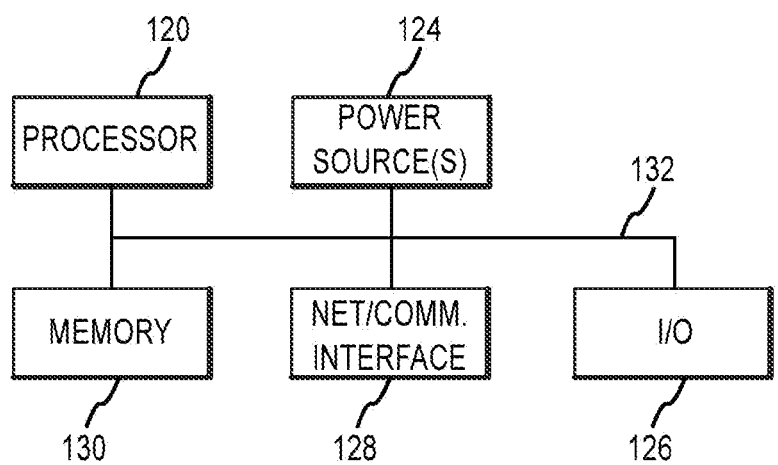
FIG. 2 is an exemplary block diagram of the computing device.

The base 102 may include select components of the computing device 102. The base 102 may be formed as base of a the computing device. FIG. 2 is an exemplary block diagram of components that may be included in the base 102. The base 102 may include a processor 120, one or more power sources 124, an input/output interface 126, a network/communication interface 128, and memory 130. These components may be in communication with each other via a system bus 132, wirelessly, or other communication mechanism.

Referring now to FIGS. 1A-2, select components such as the processor 120, the memory 130, and so on, of the base 102 may be at least partially surrounded by the enclosure 118. The enclosure 118 forms an outer portion of the base 102 and defines a cavity that may at least partially enclose the various components of the base 102. The enclosure 118 may include apertures defined within the enclosure 118. The apertures may allow select components to extend past the enclosure and/or communicate outside of the enclosure 118. For example, a keyboard 106 may include keys that extend through apertures within the enclosure 118, and input ports 112 may be aligned with the apertures in order to receive a communication or charging connector.

The input/output interface 126 provides a platform for a user to interact with the computing device 102, as well as provides output to the user (e.g., video, images, sound). The input/output interface 126 may provide include multiple input options, e.g., a keyboard 106, a input members 108, as well as input/output ports 112. The input ports 126 may include, for example, universal serial bus connections, tip ring sleeve connector connections, and so on.

In one embodiment, the keyboard 106 may be positioned on a top surface of the base 102. The keyboard 106 may be used to provide input to the computer 102 by providing depressible keys. The keys may correspond to various symbols, such as the alphabet and numbers. In some examples, the input member 108, which is discussed in more detail below, may include keyboard type keys and may function as a keyboard for the computer 102.

Similarly, the input member 108 may provide an input for a user through the enclosure 118 and may include a touch or other sensor to detect a user's motions on the mouse pad 108.

The base 102 may further include a power button 110 to power the computing device 100 on and off. The power source 124 may be in communication with the power button 110, such that when the computing device 100 is turned, the power source 124 may be accessed by the processor 120, or other components. The power source 124 may include a portable source, e.g., battery or solar panel, and/or a wired source, e.g., power cable. Furthermore, in some embodiments, the computing device 100 may include multiple power sources 124, e.g., a portable power source (battery) and a wired power source (e.g., power cord).

The processor 120 may control operation of the computing device 100 and its various components. The processor 124 may be substantially any electronic device capable of processing, receiving, and/or transmitting instructions. For example, the processor 120 may be a microprocessor or a microcomputer.

The network/communication interface 128 may receive and transmit various electrical signals. For example, the network/communication interface 128 may be used to receive data from a network, or may be used to send and transmit electronic signals via a wireless or a wired connection (e.g., Internet, WiFi, Bluetooth, or Ethernet). In one example, the network/communication interface 128 may be in communication with a wireless chip on the base 102 for communicating with the display 104, discussed in more detail below with respect to FIG. 3. Furthermore, the base 102 may include multiple wireless devices with the network/communication interface 128. In one example, the base 102 may include a first wireless component for transmitting signals via WiFi and a second wireless component for transmitting signals via 60 GHz signal.

The memory 130 may store electronic data that may be utilized by mobile computing device 100. For example, the memory 130 may store electrical data e.g., audio files, video files, document files, and so on, corresponding to various applications. The memory 130 may be, for example, non-volatile storage, a magnetic storage medium, optical storage medium, magneto-optical storage medium, read only memory, random access memory, erasable programmable memory, or flash memory.

Figure 3:
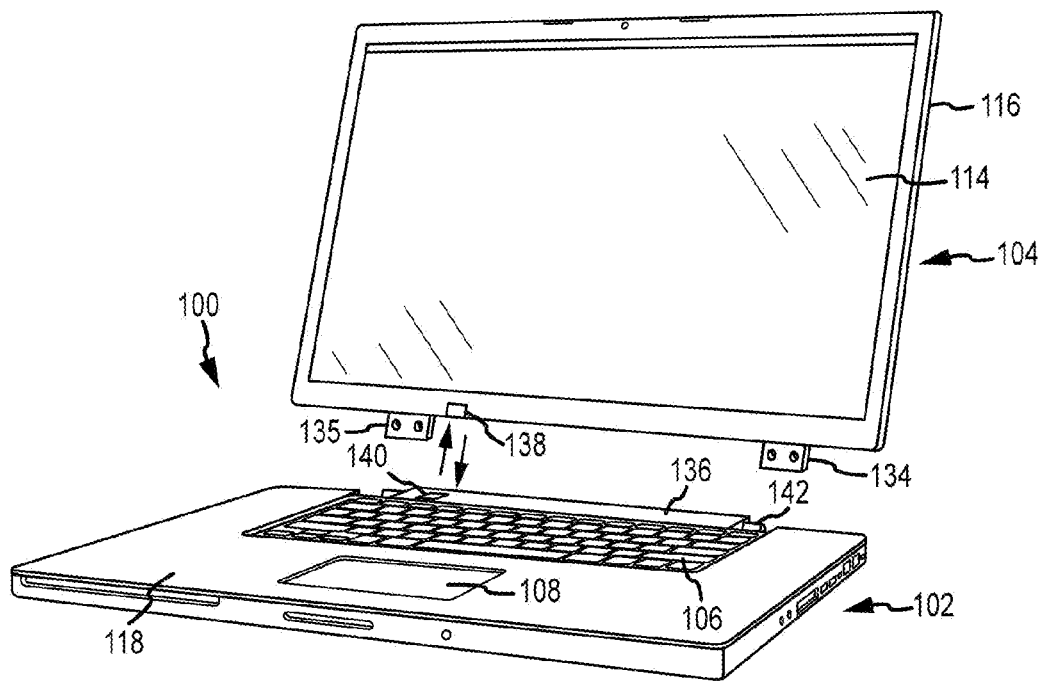
FIG. 3 is a perspective view of the computing device with the display removed from the base.

The connection interface between the base 102 and the display 104 will now be discussed in further detail. FIG. 3 is an isometric view of the computing device 100 with the display 104 separated from the base 102. As can be seen in FIG. 3, the base 102 may also include a display support or clutch barrel 136. The clutch barrel 136 may be positioned on a rear side of the base 102 and in some embodiments the display 104 may be positioned adjacent to and on top of the clutch barrel 136. It should be noted that although the clutch barrel 136 is illustrated as being integrated with the base 102, in some instances the clutch barrel 136 may be securely attached to the display 104. In these instances, the clutch barrel 136 may be removed from the base 102 with the display 104.

In some embodiments, the clutch barrel 136 may house or enclose communication cables for the base 102 and/or display 104 as well as provide connection portions 142 for the display 104. In some examples, the clutch barrel 136 may include a power and/or data cables for the display 104 for when the display 104 is attached to the base 102. For example, the display 104 may communicate wirelessly with the base 102 when detached from the base 102, but when coupled to the base 102 may communicate through a wired connection. In this example, power and/or data may be transferred through the clutch barrel 136 when the display 104 is attached and may have higher data transfer rates, as well as more efficient power transfer. However, so that the display 104 may be removed, the data and power may be transferred wirelessly when the display 104 is detached. These embodiments provide flexibility for the computing device 100 while also providing efficient data and power transfer when the base 102 and display 104 are attached together.

However, in other examples, where the display 104 may be in only communication with the base 102 wirelessly, the clutch barrel 136 may be omitted, or may be significantly reduced in size as compared with conventional computing devices. In one example, the connection portions 142, which extend from either side of the clutch barrel 136 may be the only portion of the clutch barrel 136.

The connection or joinder portions 142, which may also function to transfer power and/or data between base and display, may receive a hinge or other fastener for the display 104, as discussed in more detail below. In another example, each connection portion 142 may be a hinge which receives a support or corresponding connection member attached to the display 104. Essentially, the connection portions 142 may be configured to appropriately support the display 104 on the base 102 and may be alternatively designed depending on the particular rotatable support connection used between the base 102 and the display 104.

The connection portions 142 may also provide power to the display 104 from the base 102. For example, the connection portions 142 may include an inductive coil, capacitive plate, or other power transfer component in order to transfer power to the display 104. In yet other examples, the connection portions 142 may include an electrical contact defined on their outer surface adjacent to an electrical contact on the support members 134 of the display 104. The electrical contact may be electrically connected to the battery and the battery and the hinge may be electrically connected to a power bus. When the display 104 is docked or otherwise attached to the base 102, power may be supplied from the battery or power source to the display 104. The connection portions 142 an/or the electrical contacts may be retractable into the enclosure or may include a removable cover, or protection member. Thus, the electrical contacts may only be exposed when the display 104 is attached to the base 102.

In one example, one connection portion 142 may transfer power and the second connection portion may be a ground for the base 102. The power transfer property and functionality of the connection portions 142 is discussed in more detail below with respect to the display 104 and its corresponding support members.

The base 102 may include a wireless chip 140 for transmitting data to and receiving data from, the display 104. The wireless chip 140 may also be in communication with the processor 120 and the processor 120 may provide data to be transmitted to the display 104. The wireless chip 140 may transmit video output data and other data to be displayed or that may otherwise affect the display 104, e.g., settings such as brightness or contrast.

Additionally, the wireless chip 140 may receive data from the display 104. For example, the display 104 may include a camera that may transmit image or video data to the base 102. In another example, the display 104 may include a sensor and may transmit data back to the display, such as, an ambient light sensor, capacitive touch sensor, microphone, movement sensor (accelerometer, gyroscope, and so forth), and so on. Similarly, the display 104 in some examples may be used as an input device, and may transfer data related to input mechanism to the display 104. In these examples, the base 102 may receive data from the display 104 that may affect an image or video displayed on the display 104, may be transmitted to another computing device, or may be used to process other data within the base 102.

The wireless chip 140 may be substantially any type of transmission component, such as a Bluetooth wireless chip, WiFi wireless chip, or the like. In one embodiment, the wireless chip 140 may be configured to wirelessly transfer data at a 60 GHz frequency. In this embodiment, the wireless chip 140 may include an antenna, as well as connection members. The antenna receives and transmits data to a corresponding wireless chip (e.g., a wireless chip on the display 140). The connection members or circuitry provide electronic communication from the antenna to and from the processor 130, or other electronic components.

The wireless chip 140 may be operably connected to the clutch barrel 136 or another portion of the enclosure 118 or another portion of the base 102. When the wireless chip 140 is connected to the clutch barrel 136 or outer portion of the enclosure 118, it may be best positioned to have a line of sight to the display 104 (when the display 104 is coupled or decoupled from the base 102). This may enhance data transmission to and from the chip 140, or if the wireless chip 140 transmits over select radio frequencies (e.g., 60 GHz) may be required for data transmission. The wireless chip 140 may be positioned substantially anywhere on the base 102, but in certain embodiments it may be positioned to have a line of sight to its corresponding wireless chip, as will be discussed in more detail below.

The display 104 will now be discussed in more detail. Referring to FIGS. 1A and 3, the display 104 may include a screen 114 and an enclosure 116. The display 104 may be both rotatably connected to the base 102 as well as selectively removable from the base 102. Thus, the computer device 100 to be both a single operably connected device and two separate communicating devices. As discussed above, the wireless connectivity between the base 102 and the display 104 allows the base 102, and specifically a clutch barrel 136, to have a reduced size as compared to a conventional computing device. Similarly, the wireless connectivity allows the display 104 to be reduced in size, as well as to have a more streamlined appearance, as wires and other connection components may be removed.

It should be noted that in some embodiments, the display 104 may also transfer and receive data from an electronic component other than or in addition to the base 102. For example, the display 104 may receive data from a digital camera, smart phone, and so on. This may allow the display 104 to be a remote display for substantially any type of electronic computing device.

Additionally, as discussed above, the display 104 may also transfer data to the base 102. For example, the wireless chip 138 may transfer, as well as receive, data to the wireless chip 140. The data may be substantially any type of data, such as data from an input mechanism (e.g., capacitive touch sensor, button, switch, and so on), sensor data (e.g., light sensor, image sensor, microphone sensor), or display data (e.g., current settings, pixel status, and so on).

The screen 114 may display video or still graphical images from the base 102, such as, but not limited to, photographs, movies, a graphical user interface, application interfaces, and so on. The screen 114 may be substantially any type of display mechanism, such as but not limited to, a liquid crystal display, plasma display, cathode ray tube display, light emitting diodes, organic light emitting diodes, and so on. Furthermore, in some embodiments, the screen 114 may include a touch sensing or other input mechanism, such as a capacitive touch sensor, to allow the screen 114 to further function as a input device for the computing device 100. This type of input functionality may be helpful when the display 104 is removed from the base 102.

The enclosure 116 or frame may support the screen 114 on the display 104. In some embodiments, the enclosure 116 may substantially surround the screen 114 on a first or back side and may only be positioned around the sides of the screen 114 on a second or front side. In this manner, the screen 114 may be viewable by a user when the user is facing the second or front side of the display 104. In other embodiments, the enclosure 116 may surround more or less of the screen 114.

In some embodiments, the display 104 may also include some processing components. For example, the display 104 may include a graphical processing unit that may process images, videos, and other graphics to be displayed on the screen 114. In these embodiments, the processor 120 may operate the base 102 and may transfer data, optionally including operating instructions, via the wireless chips 138, 140 to the graphical processing unit. However, in other examples, the graphical processing unit may be included in the base 102 and the eventual display data produced by the graphical processing unit may be transferred to the display 104. In certain embodiments, the system processor may be resident in the display rather than the base. Thus, when the display is removed, the processor may configure the display to operate as a standalone tablet computer; the processor may simultaneously continue to interact with the base, if necessary or desired. In alternative embodiments, the processor may operate only the display when the display and base are separated.

In still other embodiments, each of the base and display may have dedicated processors that coordinate functionality with one another.

With continued reference to FIG. 3, the display 104 may also include one or more support members 134 or power transfer members. The support members 134 may be operably connected to a bottom portion of the display 104 and rotatably connect the display 104 to the base 102. In some embodiments, the support members 134 are selectively attachable to the connection portions 142 connected the base 102. In one embodiment, the support members 134 may be at least partially received into the connection portions 142 on the base 102. For example, the support members 134 and the connection portions 142 may be a hinge system that may include a support post received within a hinge. The hinge system may then allow the display 104 to rotate with respect to the base 102.

Additionally, the support members 134 may retract into the enclosure 116 when the display 104 is detached from the base 102. For example, the support members 134 may be biased upwards by a spring and when the display 104 is detached from the base 102, the spring may force the support members 134 into the enclosure 116. Alternatively, the support members 134 may be biased by a spring downwards so that the support members 134 may "snap fit" into position with respect to the connection portions 142.

The support members 134 may operably coupled to a switch, latch, relay or other switching element. When the display 104 is removed from the base 102, the switch may electronically or mechanically retract the support members 134 into the enclosure 116. For example, the switch may contract when the display 104 is detached, contracting the support members 134. For example, the switch may have a magnetic polarization or other magnetized force and may interact with another element, such as an electromagnet, to mechanically pull the support members 134 into or out of the enclosure 116.

The switch may also act on the support members 134 in the opposite manner when the display 104 is attached to the base 102. For example, if a user provides an input to the device 100 that the display 104 is to be attached or the base 102 or display 104 may include a sensor that may detect when the display 104 is in a particular position. Once the display 104 is being connected to the base 102, the switch may extend the support members 134 to connect with the connection portions 142. Other embodiments are possible that extend and retract the support members 134 as the display 104 is connected and disconnected form the base 102. Thus, the aforementioned embodiments are exemplary only.

The support members 134 may also transfer power from the base 102 to the display 104. In one embodiment, one support member 134 may be an electrically conductive material or include an electrical contact coupled or otherwise connected to the power source 124 in the base 102, e.g., through one of the support portions 142. The non-electrically conductive support member 135 may be electrically coupled to ground. In this manner, the display 104 may not need to include a separate power source from the base 102 as power may be transferred through the support portion 142 to the support member 134 in the display 104. This configuration may provide power to the display 104 when the display is operably connected to the base 102, that is, when the support 142 is connected to the support members 134 and the display 104 is attached to the base 102. The wireless power transmission may eliminate the need for the display 104 to include a separate power cord or power source. Thus, when the display 104 is operably attached to the base 102, the number of wiring connections required for the computing device 100 may be reduced.

It should be noted that in other examples, the display 104 and the base 102 may be detached from each other and still transfer power wirelessly. For example, the support members 134 and the connection portions 142 may include coils or capacitive plates that may transfer power wirelessly. In this example, the support members 134 may be electrically coupled to the base 102, specifically, the support members 134 may be in electrically coupled to the connection portions 142. The support members 134 and the connection portions 142 may include corresponding coils that may transfer power inductively. The connection portions 142 may be in electrical communication with the power source 124 and may have an induced magnetic field when powered. The induced magnetic field may induce a current in the coils in the support members 134, thus providing electricity to the display 104. Similarly, the support members 134 and the connection portions 142 may transfer power through capacitive inductance, or other wireless power transfer mechanisms.

In some embodiments, the base 102 may transfer power and/or data to the display 104 both wirelessly and via wired connections. In one embodiment, the display 104 and/or the base 102 may include a sensor or detection mechanism that may detect when the display 104 is decoupled or removed from the base 102. When the decoupling is detected, the sensor may alert the processor 120 to the decoupling, and the processor 120 may switch the data and/or power transfer to the wireless chips 138, 140 and/or support members 134 and connection portions 142 from a wired mechanism.

In another example, the wired components may be contained in a detachable cable that may be detached by the user or automatically as the display 104 is pulled from the base 102. When the cable is detached the power and/or data may automatically switch from the wired cables to the wireless components. In these aforementioned embodiments, data and/or power may be transferred in an efficient manner (through wired connections) when the display 104 is coupled to the base 102, but may be transferred in a wireless and more flexible manner when the display 104 is decoupled from the base 102. This allows the computing device 100 to automatically switch transfer modes depending on the current coupling state of the base 102 and display 104.

In one embodiment, the connection portions 142 may be substantially cylindrical support members and may be inserted through an aperture through the support members 134. The support members 134 may be secured to the display 104 and the connection portions 142 may be secured to the base 102. In this manner, the display 104 may rotate around the connection portions 142 from the open (FIG. 1A) position to the closed position (FIG. 1B).

The display 104 may also be in electrical communication with the base 102 to transfer data as well as power. The display 104 may include a wireless chip 138 positioned substantially anywhere on the display 104. The wireless chip 138 may be in electrical communication with the wireless chip 140 on the base 102. In this manner, the wireless chip 140 may transfer data to and from the processor 128 from the wireless chip 138.

In one example, the wireless chips 138, 140 may transfer data over a 60 GHz frequency and therefore, the wireless chips 138, 140 may be positioned so as to have substantially clear line of sight between each other. In other words, the wireless chips 138, 140 may be positioned on an exterior surface of the respective enclosures 116, 118. This may allow the data transfer between the wireless chips 138, 140 to be substantially faster than if the line of sight may be blocked. In this example, the wireless chip 138 may be substantially the same as the wireless chip 140 on the base 102. For example, the wireless chip 138 may include an antenna and connection members.

In embodiments where the chips 138, 140 transfer data over the 60 GHz radio frequency band, data transferred may allow be about a gigabit per second. Thus, the display 104 may receive data quickly from the base 102 so that the user may not perceive a difference between a display 104 that is connected via a wire to the base 102 and when the display 104 is connected wirelessly to the base 102.

Furthermore, although when the wireless chips 138, 140 transfer data via a 60 GHz spectrum they may be required to be within a line of sight of each other, this may allow multiple computing devices 100 to be used in the same room each using a similar frequency band to transmit data. The computing devices 100 and specifically, the display 104 and base 102 may not be required to be associated with a particular wireless chip 138, 140 via a unique identifier (e.g., identification number), as the chips 138, 140 may only transfer data to another corresponding chip that is within its line of sight. Thus, multiple devices may use the same network and frequency in a close proximity without a particular code, unlike Bluetooth technologies. However, it should be noted that in other embodiments, the wireless chips 138, 140 may be substantially any type of electrical communicating mechanism, e.g., WiFi, Bluetooth, and so on.

Figure 4:
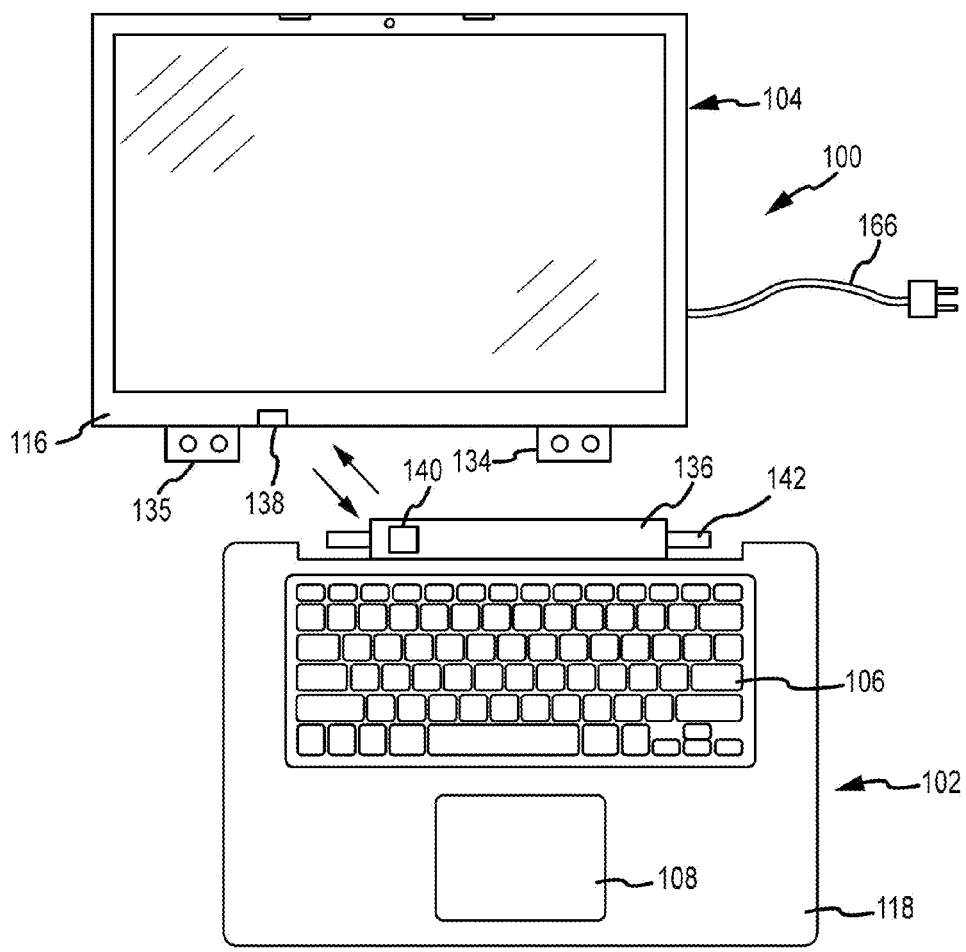
FIG. 4 is a perspective view of another embodiment of the computing device with the display removed from the base.

FIG. 4 illustrates another embodiment of the computing device 100. In this embodiment, the display 104 may include a cable 166 for electrically connecting to a power source, e.g., wall outlet, battery, or the like. The wireless chips 138, 140 may be used to transmit data to and from the base 102 and the display 104. In this embodiment, the connection portions 142 and the support members 134 may be used to operably connect the base 102 and the display 104, but may not transfer power between the base 102 and the display 104.

Figure 5:
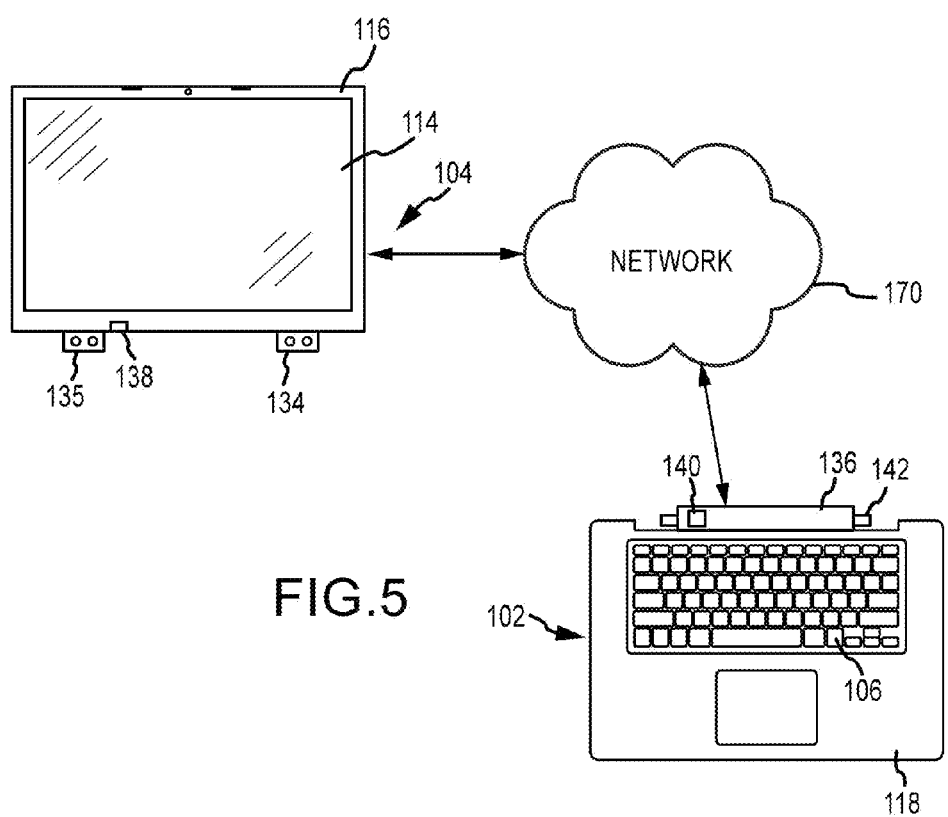
FIG. 5 is a diagram of the computing device with the base and the display communicating over a network.

The computing device 100 may be used with the display 104 attached or detached from the base 102. When the display 104 is attached to the base 102, power and/or data may be transmitted to and from the base 102 and the display 104 in substantially the same manner as when the display 104 is detached. FIG. 5 is a diagram illustrating data and/or power transfer from the base 102 to the display 104. Referring to FIGS. 4 and 5, in operation the display 104 may be connected and supported to the base 102 via the support members 134 and the connection portions 142. The support members 134 and the connection portions 142 may also transfer power from the base 102 to the display 104. However, as shown in FIG. 4, the display 104 may also include a separate power supply source, e.g., power cord 166.

Data is transmitted to the display 104 from the base 102 via the wireless chips 138, 140. The wireless chips 138, 140 may both send and receive data via a wireless network 170. The wireless network may be a 60 GHz transmission, WiFi, Bluetooth, and so on. The display 104 may transfer data to the base 102, such as input data, e.g., if the display 104 includes an input/output function, settings data, e.g., screen brightness, contrast, and the like.

CONCLUSION

The foregoing description has broad application. For example, while examples disclosed herein may focus on a removable display for a laptop, it should be appreciated that the concepts disclosed herein may equally apply to other electronic devices. Similarly, although the input device may be discussed as being removable, the devices and techniques disclosed herein are equally applicable non-removable displays. Accordingly, the discussion of any embodiment is meant only to be exemplary and is not intended to suggest that the scope of the disclosure, including the claims, is limited to these examples.

What is claimed is:

1. A computer comprising: a base and a display, wherein the base comprises:
    a processor;
    a base wireless chip; and
    a power source;
    wherein the display is detachably coupled to the base and rotatable about the base while coupled to the base and wherein the display comprises:
        a first retractable support member that interfaces with the base;
        a screen for displaying content;
        a display wireless chip in communication with the base wireless chip, wherein the display wireless chip is adjacent to the first retractable support member; and
        a second retractable support member that is in communication with the power source, wherein the second retractable support member includes an inductive coil, wherein the base wireless chip wirelessly transmits data from the processor to the display, and wherein when the display is detached from the base, the power source wirelessly transmits power to the inductive coil of the second retractable support member.

2. The computer of claim 1, wherein the base wireless chip and the display wireless chip transmit data over a 60 GHz frequency.

3. The computer of claim 1, wherein the base wireless chip is operably connected to the base so as to be in a line of sight with the display wireless chip.

4. The computer of claim 1, wherein the computer is a portable computer.

5. The computer of claim 1, wherein the base further comprises first and second base supports, wherein the first and second base supports are configured to support the display, and wherein the first retractable support member is configured to be operably coupled to the first base support, and wherein the second retractable support member is configured to be operably coupled to the second base support.

6. The computer of claim 5, wherein when the display is coupled to base, the second base support transmits power from the power source to the second retractable support member.

7. The computer of claim 5, wherein the second base support comprises an inductive coil electronically coupled to the power source and wherein when the display is in a first position, the inductive coil of the second base support induces a current in the inductive coil of the second retractable support member.

8. An electronic display configured to connect to a computer base, the electronic display comprising:
    a screen;
    a wireless chip configured to transmit data to the computer base; and
    a power source in communication with the screen;
    a first retractable support member that interfaces with the computer base;
    a second retractable support member that is in communication with the power source, wherein the second retractable support member includes an inductive coil, and wherein when the electronic display is detached from the computer base, the power source wirelessly transmits power to the inductive coil of the second retractable support member.

9. The electronic display of claim 8, wherein the second retractable support member has a first configuration in which the second retractable support member protrudes from a bottom surface of the display, and wherein the second retractable support member has a second configuration in which the second retractable support member is entirely enclosed within the display.

10. The electronic display of claim 9, wherein the second retractable support member is the power source of the electronic display, and wherein the computer base transfers power to the support member when the display is operably connected to the computer base.

11. The electronic display of claim 9, wherein the second retractable support member is the power source and when the electronic display is operably connected to the computer base, a current is induced into the inductive coil by the power source.

12. The electronic display of claim 8, wherein the wireless chip comprises:
    an antenna; and
    a communication component in electrical communication with the antenna.

13. The electronic display of claim 8, wherein the screen is a liquid crystal screen.

14. The electronic display of claim 8, wherein the screen comprises a capacitive touch sensor.

15. A portable computer comprising:
    a first portion comprising:
        a processor;
        a first wireless component in communication with the processor;
        a power source in communication with the processor;
        a first enclosure at least partially surrounding the processor; and
        a first power transfer member extending at least partially outside of the enclosure; and
    a second portion detachably coupled to the first portion, wherein the second portion is configured to rotate about the first portion when the second portion is coupled to the first portion, the second portion comprising:
        a screen;
        a second wireless component in communication with the first wireless component and the screen;
        a second power transfer member in electrical communication with first power transfer member, wherein the second power transfer member provides support to the second portion when the second portion is coupled to the first portion, wherein the second power member is retractable when the second portion is detached from the first portion, and wherein the second power transfer member includes an inductive coil;
        a second enclosure that at least partially surrounds the screen; and
        a spring that applies a bias force to the second power transfer member;
    wherein the first power transfer member communicates power to the second power transfer member; and
    the first power transfer member and the second power transfer member cooperate to detachably couple the first portion and the second portion.

16. The portable computer of claim 15, wherein the first wireless component and the second wireless component transfer data over a 60 GHz frequency band.

17. The portable computer of claim 15, wherein the first wireless component is positioned on an outer surface of the first enclosure.

18. The portable computer of claim 15, wherein the first power transfer member is a hinge.

19. The portable computer of claim 15, wherein the second power transfer member is a hinge.

20. The portable computer of claim 15, wherein the second power transfer member is forced into the second enclosure when the second portion is detached from the first portion.

21. The computer of claim 1, wherein the first retractable support member comprises a non-electrically conductive support member, and wherein the second retractable support member comprises an electrically conductive support member.

* * * * *